United States Patent
Facchinello

(10) Patent No.: US 10,112,466 B2
(45) Date of Patent: Oct. 30, 2018

(54) PIVOTING TONNEAU COVER SYSTEM FOR TRUCK

(71) Applicant: Extang Corporation, Ann Arbor, MI (US)

(72) Inventor: Jerome J. Facchinello, Grand Blanc, MI (US)

(73) Assignee: Extang Corporation, Ann Arbor, MI (US)

( * ) Notice: Subject to any disclaimer, the term of this patent is extended or adjusted under 35 U.S.C. 154(b) by 1 day.

(21) Appl. No.: 15/407,956

(22) Filed: Jan. 17, 2017

(65) Prior Publication Data
US 2018/0201106 A1    Jul. 19, 2018

(51) Int. Cl.
| | |
|---|---|
| *B60J 7/185* | (2006.01) |
| *B60J 7/14* | (2006.01) |
| *E05F 15/53* | (2015.01) |
| *E05F 15/46* | (2015.01) |
| *E05D 15/46* | (2006.01) |
| *E05D 3/14* | (2006.01) |
| *E05F 1/12* | (2006.01) |

(52) U.S. Cl.
CPC ............ *B60J 7/141* (2013.01); *B60J 7/1856* (2013.01); *E05D 3/145* (2013.01); *E05D 15/46* (2013.01); *E05F 1/1292* (2013.01); *E05F 15/53* (2015.01); *E05Y 2900/542* (2013.01); *E05Y 2900/548* (2013.01)

(58) Field of Classification Search
CPC .......... B60J 7/1856; B60J 7/141; E05F 15/53; E05F 15/46; E05D 15/46; E05Y 2900/542
See application file for complete search history.

(56) References Cited

U.S. PATENT DOCUMENTS

| | | | |
|---|---|---|---|
| 5,636,893 A | 6/1997 | Wheatley et al. | |
| 6,447,045 B1 | 9/2002 | Dickson et al. | |
| 7,264,297 B2 | 9/2007 | Boulard et al. | |
| 7,484,788 B2 | 2/2009 | Calder et al. | |
| 7,537,264 B2 | 5/2009 | Maimin et al. | |
| 7,748,767 B2 | 7/2010 | Terhaar et al. | |
| 8,262,148 B2 | 9/2012 | Rusher et al. | |
| 8,544,934 B2 | 10/2013 | Maimin et al. | |
| 8,672,388 B2 | 3/2014 | Rusher et al. | |
| 9,211,834 B2 | 12/2015 | Facchinello et al. | |
| 2006/0012211 A1* | 1/2006 | Keller ..................... | B60J 7/141 296/100.09 |

* cited by examiner

*Primary Examiner* — D Glenn Dayoan
*Assistant Examiner* — Melissa A Black
(74) *Attorney, Agent, or Firm* — Harness, Dickey & Pierce, P.L.C.

(57) ABSTRACT

A tonneau cover system includes a cover and a pivot mechanism. The cover includes a plurality of panels hingedly coupled together, and is foldable between an extended configuration and a folded configuration. The pivot mechanism includes a first link bar and a second link bar. The first link bar has an upper end pivotally connected to a forward panel and the second link bar has an upper end pivotally connected to the forward panel. With the cover in the folded configuration, the pivot mechanism may move the stack from an initial stack configuration in which the forward panel is in the first plane to a storage stack configuration in which the forward panel of the cover extends upright along a second plane, and to simultaneously move the forward edge of the forward panel rearwardly and above the first plane.

15 Claims, 8 Drawing Sheets

PIVOTING TONNEAU COVER SYSTEM FOR TRUCK

FIELD

The present disclosure relates to tonneau cover system for a truck.

BACKGROUND

This section provides background information related to the present disclosure which is not necessarily prior art.

Trucks such as pickups and trucks having a cargo box can be a popular type of vehicle because the cargo box enables objects of various sizes to be placed therein and transported. The cargo box pickup generally has a floor surface or bed that is bounded by a forward wall, opposing sidewalls and a tailgate providing a rearward wall.

Covers can be used to enclose the cargo box to protect the contents against dirt, debris, and other environmental contaminants, and to improve the aesthetic quality thereof. In some cases, the covers can be formed of generally planar sections or panels hingedly coupled together so they can be folded together in a stacked arrangement to allow access to the cargo box. The stacked panels typically still leave a portion of the cargo box covered.

In some cases the stacked panels can be rotated so the tonneau cover is angled and extends upwardly above the truck box. Prop-rods can be used to retain the stacked panels in their upwardly angled position, but can require multiple steps, including coupling components together, and/or can limit locking options or angular orientations.

SUMMARY

This section provides a general summary of the disclosure, and is not a comprehensive disclosure of its full scope or all of its features.

In accordance with an aspect of the present disclosure, a tonneau cover system for a cargo box of a truck can include a cover and a pivot mechanism. The cover can include a plurality of panels hingedly coupled together. The plurality of panels can include a forward panel mountable adjacent a forward end of the cargo box. The forward panel can include a forward edge, a rear edge, and a first side edge that can extend between the forward edge and the rear edge. The cover can be foldable between an extended configuration in which the cover extends along a first plane to overlie the cargo box and a folded configuration in which the plurality of panels are arranged in a stack on the forward panel. The pivot mechanism can attach the cover to the cargo box. The pivot mechanism can include a first link bar and a second link bar. The first link bar can have an upper end pivotally connected to the forward panel adjacent the first side edge intermediate the forward edge and the rear edge at a first point located a first distance from the forward edge. The first link bar can have a lower end connectable to a sidewall of the cargo box and a first length. The second link bar can have an upper end pivotally connected to the forward panel adjacent the first side edge intermediate the forward edge and the rear edge at a second point located a second distance from the forward edge greater than the first distance. The second link bar can have a lower end connectable to the sidewall of the cargo box and a second length greater than the first length. With the cover in the folded configuration, the pivot mechanism can be designed to move the stack from an initial stack configuration in which the forward panel is in the first plane to a storage stack configuration in which the forward panel of the cover extends upright along a second plane, and to simultaneously move the forward edge of the forward panel rearwardly and above the first plane.

In accordance with another aspect of the present disclosure, a tonneau cover system for a cargo box of a truck can include a cover and a pivot mechanism. The cover can include a plurality of panels hingedly coupled together. The plurality of panels can include a forward panel mountable adjacent a forward end of the cargo box. The forward panel can include a forward edge, a rear edge, and a first side edge extending between the forward edge and the rear edge. The cover can be foldable between an extended configuration in which the cover extends along a first plane to overlie the cargo box and a folded configuration in which the plurality of panels are arranged in a stack on the forward panel. The pivot mechanism can attach the cover to the cargo box, and can include a cargo linkage, a cover linkage, and a pivot linkage. The cargo linkage can be connected to a sidewall of the cargo box that is adjacent to the forward panel of the cover. The cover linkage can be connected to the forward panel of the cover. The pivot linkage can include a first link bar and a second link bar. The first link bar can have an upper end pivotally connected to the forward panel adjacent the first side edge intermediate the forward edge and the rear edge at a first point located a first distance from the forward edge. The first link bar can have a lower end connectable to the sidewall and have a first length. The second link bar can have an upper end pivotally connected to the forward panel adjacent the first side edge intermediate the forward edge and the rear edge at a second point located a second distance from the forward edge greater than the first distance. The second link bar can have a lower end connectable to the sidewall and has a second length greater than the first length. With the cover in the folded configuration, the pivot mechanism can be designed to move the stack from an initial stack configuration in which the forward panel is in the first plane to a storage stack configuration in which the forward panel of the cover extends upright along a second plane, and to simultaneously move the forward edge of the forward panel rearwardly and above the first plane.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
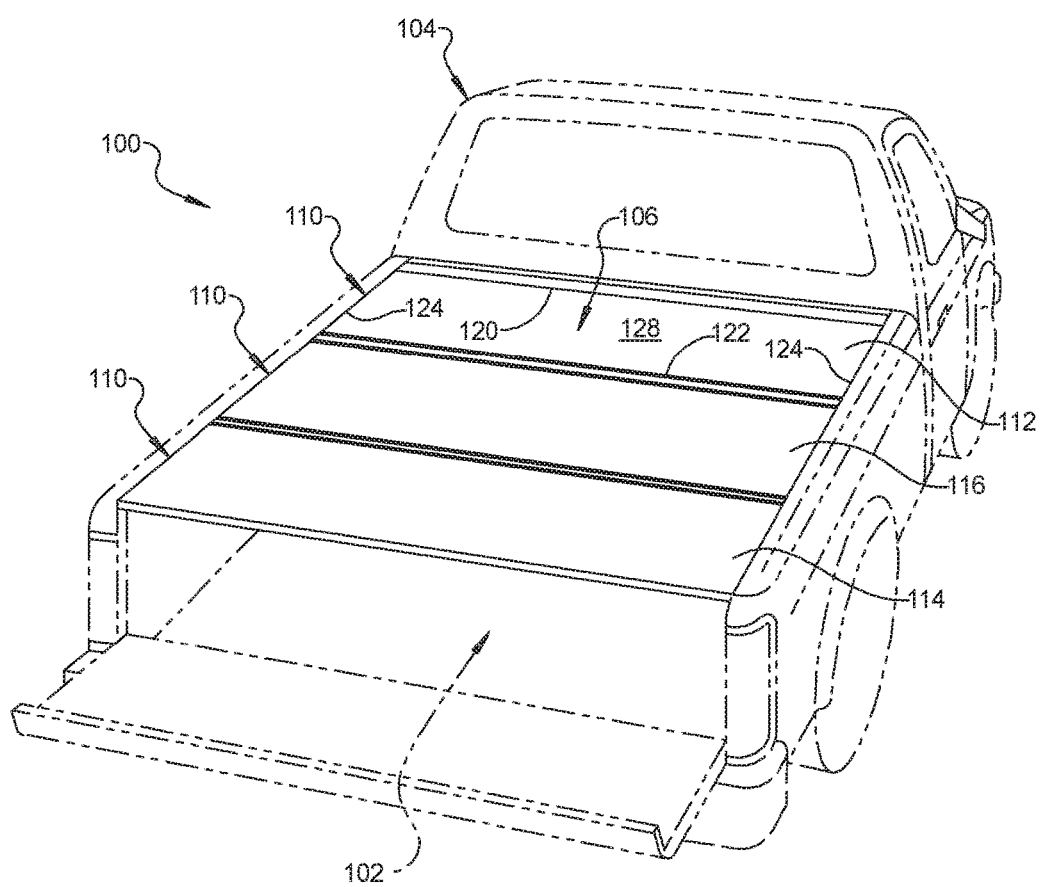
FIG. 1 is a perspective view of one exemplary embodiment of a tonneau cover system with a pivot mechanism arranged on a cargo box of a truck in an extended configuration in accordance with the present disclosure.
Figure 2:
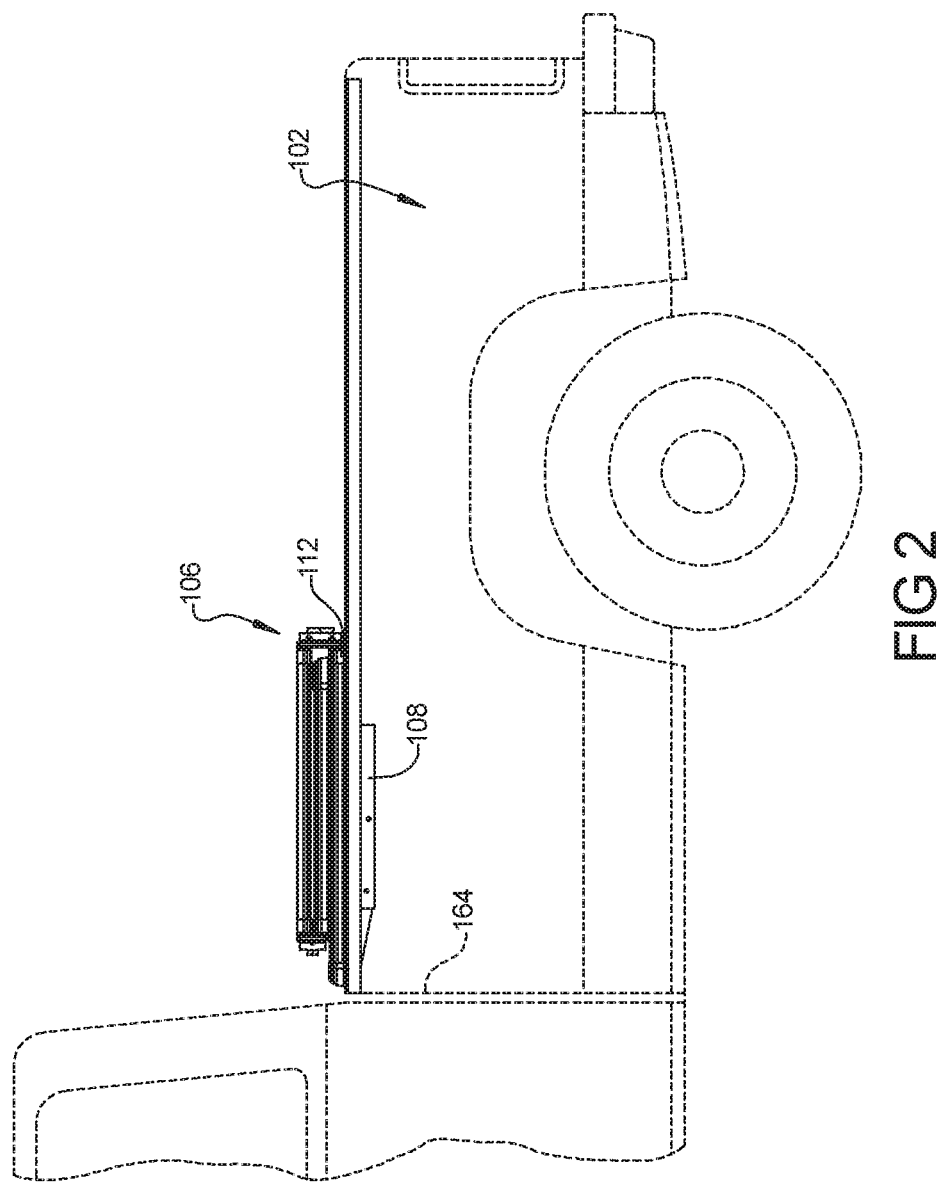
FIG. 2 is a side elevational view of a tonneau cover of the tonneau cover system positioned on the cargo box and in an initial stacked configuration.

Example embodiments will now be described more fully with reference to the accompanying drawings.

Referring to FIGS. 1 through 10, an example embodiment of a tonneau cover system 100 for covering a truck bed or cargo box 102 is provided. In some cases, the truck bed or cargo box 102 can be part of a pickup truck 104 and can comprise a plurality of sidewalls, namely a lateral or transverse front wall, a pair of opposing longitudinal sidewalls, and a lateral or transverse rear wall or tailgate.

The tonneau cover system 100 can include a tonneau cover 106 to cover the cargo box 102 and a pivot mechanism or a pivot member 108 to move the tonneau cover 106 to a storage configuration or position. The tonneau cover 106 can include a plurality of panels or sections 110 that can be interlockingly coupled such that adjacent panels 110 provide a pivotable or hinged connection therebetween.

In some embodiments, the panels 110 of the tonneau cover 106 can be a rigid panel. In some instances, an upper or top face and bottom face of the rigid panels can be provided by top and bottom outer sheet layers or skins, which can be made of metal or plastic material, that sandwich a central core, which can comprise a rigid foam, honeycomb, or other structure.

The plurality of panels 110 can include a forward panel 112, a rearward panel 114, and an intermediate panel 116 positioned between the forward panel 112 and the rearward panel 114. While the figures illustrate a tonneau cover 106 having three panels 110, the tonneau cover can be configured in various suitable ways and can, for example, include three or more panels. The plurality of panels 110 can be hingedly coupled together to be foldable between a deployed or extended configuration covering the cargo box 102 (e.g., FIG. 1) and a folded or stacked configuration where the panels 110 are stacked upon and overlie the forward panel 112 (e.g., FIG. 2).

The forward panel 112 can be positioned adjacent a forward end or, in other words, adjacent to an end of the cargo box 102 that faces the passenger compartment of the truck 104. The forward panel 112 can include a forward edge 120, a rear edge 122, two side edges 124 extending between the forward edge 120 and the rear edge 122. The forward panel 112 can include an underside surface or a first surface 126 and a top side or second surface 128 opposite of the underside surface 126. The underside surface 126 of the panel 112 can face a surface of the cargo box 102 when the tonneau cover 106 is in the stacked configuration.

The forward panel 112 of the tonneau cover 106 can be hingedly coupled to the cargo box 102 by way of the pivot member 108. The tonneau cover system 100 can include a pivot member 108 for each of the sides 124 of the forward panel 112. Alternatively, the tonneau cover system 100 can include one pivot member 108 attached to one of the sides 124 of the forward panel 112.

The pivot member 108 can be attached to the forward panel 112 and to the cargo box 102. Specifically, the pivot member 108 can be attached adjacent to the side edge 124 of the forward panel 112 of the tonneau cover 106 and to a side longitudinal wall or sidewall 130 of the cargo box 102. In an example embodiment, the pivot member can include a cover linkage 132, a cargo linkage or sidewall linkage 134, and a pivot linkage 136. The cover linkage 132 can be connected along the underside surface 126 of the forward panel 112 of the tonneau cover 106 at a region adjacent to the side edge 124. The cargo linkage 134 can be connected to a region of the sidewall 130 adjacent to the forward panel 112. The pivot linkage 136 can be connected to the cover linkage 132 and the cargo linkage 134 and can be operable to move the cover linkage 132 with respect to the cargo linkage 134.

In an example embodiment, the cover linkage 132 can be a "U" shaped bracket that includes a base link bar 140 and two side link bars 142 that extend perpendicularly from either side of the base link bar 140. The base link bar 140 can be connected to the forward panel 112 and one of the side link bars 142 can be connected to the pivot linkage 136.

The cargo linkage 134 can be configured as an "L" shaped bracket that includes a side link bar 144 and a top link bar 146 extending perpendicular from the side link bar 144. The side link bar 144 can be connected to the sidewall 130 of the cargo box 102 and to the pivot linkage 136. For example, the side link bar 144 of the cargo linkage 134 can be connected to an inboard flange 147 of the sidewall 130, and the top link bar 146 can interface with or, in other words, can cover a top edge 149 of the sidewall 130.

The cover linkage 132 and/or the cargo linkage 134 can be made of a single piece of material (e.g., a stamped part) or can be made of multiple pieces that are fixedly joined together via, for example, welding, adhesive, etc. The cover linkage 132 and the cargo linkage 134 can be configured in various suitable ways to be connected to the tonneau cover 106 and cargo box 102, respectively, and should not be limited to the configuration illustrated in the figures.

In the example embodiment, the pivot member 108 includes the cover linkage 132 and the cargo linkage 134. Alternatively, the pivot member 108 can be configured to have the pivot linkage 136 directly coupled to the cargo box 102 and/or the forward panel 112 of the tonneau cover 106.

The pivot linkage 136 can include multiple link bars that extend between the forward panel 112 and the cargo box 102. In the example embodiment, the pivot linkage 136 includes a first link or a first link bar 150 and a second link or second link bar 152. A length of the first link bar 150 can be greater than a length of the second link bar 152.

An upper end or a first end 154 of the first link bar 150 can be pivotally connected to the cover linkage 132 and, therefore, can be pivotally connected to the forward panel 112. A lower end or second end 156 of the first link bar 150 can be pivotally connected to the cargo linkage 134 and, therefore, can be pivotally connected to the sidewall 130 of the cargo box 102. With the pivot member 108 connected to the forward panel 112 and to the cargo box 102, the upper end 154 of the first link bar 150 can be connected adjacent to the side edge 124 between the forward edge 120 and the rear edge 122 of the forward panel 112 at or substantially near a first point or a first upper connection point. For example, the first upper connection point can be located along a line 158 at a first distance from the forward edge 120 (e.g., FIG. 7). The lower end 156 of the first link bar 150 can be connected at a first point or a first lower connection point 160 along the sidewall 130 and can be located a first distance from a front 164 of the cargo box 102.

The second link bar 152 can include an upper end or a first end 166 and a lower end or a second end 168. The upper end 166 of the second link bar 152 can be pivotally connected to the cover linkage 132 and, therefore, the forward panel 112. The lower end 168 of the second link bar 152 can be pivotally connected to the cargo linkage 134 and, therefore, to the cargo box 102. The upper end 166 can be connected adjacent to the side edge 124 between the forward edge 120 and the rear edge 122 of the forward panel 112 at a second point or a second upper connection point. For example, the second upper connection point can be located along a line 170 at a second distance from the forward edge 120, where the second distance is less than the first distance of the upper end 154 of the first link bar 150. More particularly, the upper end 166 of the second link bar 152 can be positioned closer to the forward edge 120 of the forward panel 112 than the upper end 154 of the first link bar 150. The lower end 168 can be connected to the sidewall 130 of the cargo box 102 at a second point or a second lower connection point 172. The second lower connection point 172 can be located a second distance from the front 164 of the cargo box 102, where the second distance is shorter than the first distance of the lower end 156 of the first link bar 150. In other words, the lower end 168 of the second link bar 152 can be positioned closer to the front 164 of the cargo box 102 than the lower end 156 of the first link bar 150.

Figure 3:
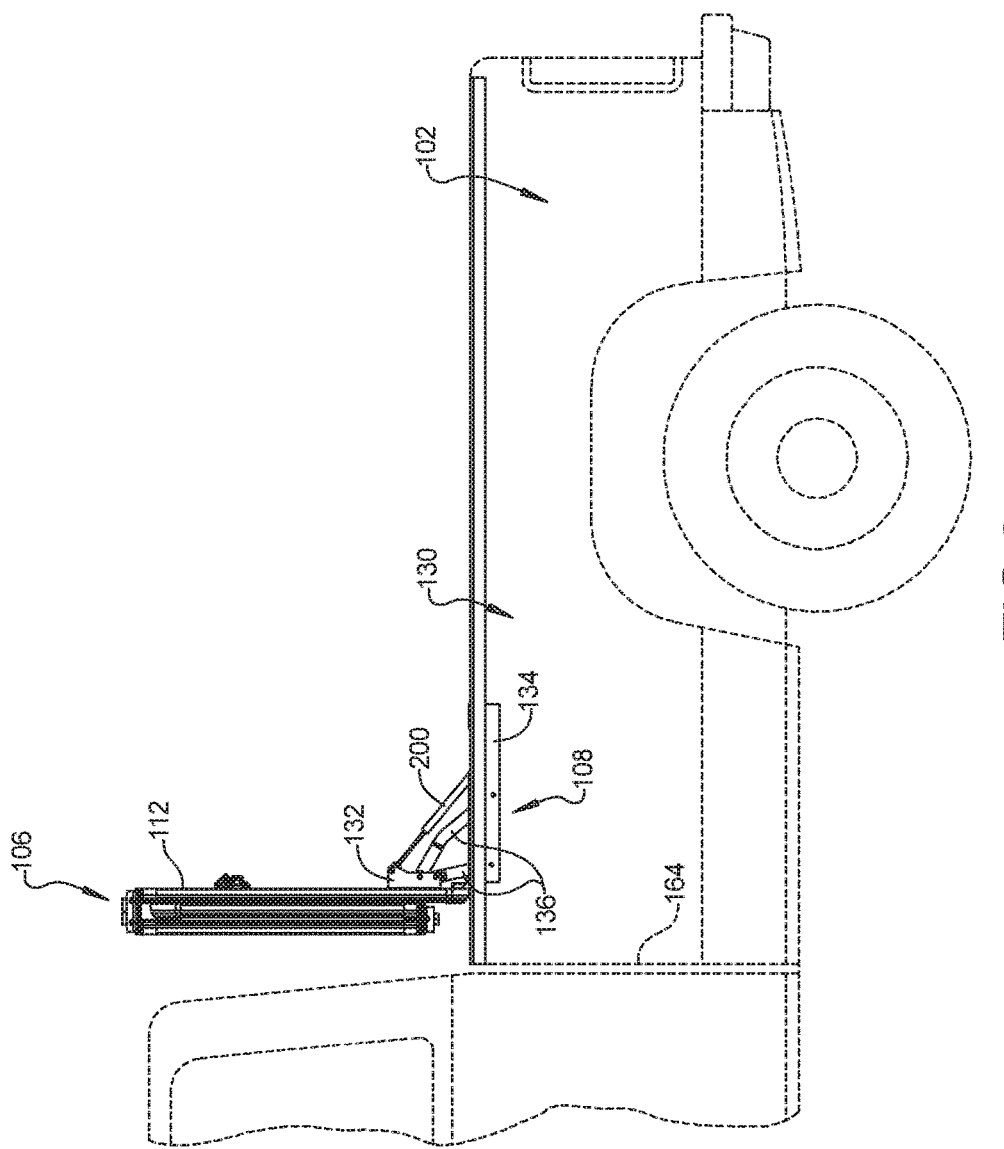
FIG. 3 is a side elevational view of the tonneau cover and a pivot mechanism of the tonneau cover system with the tonneau cover system positioned on the cargo box and in a storage configuration.
Figure 6:
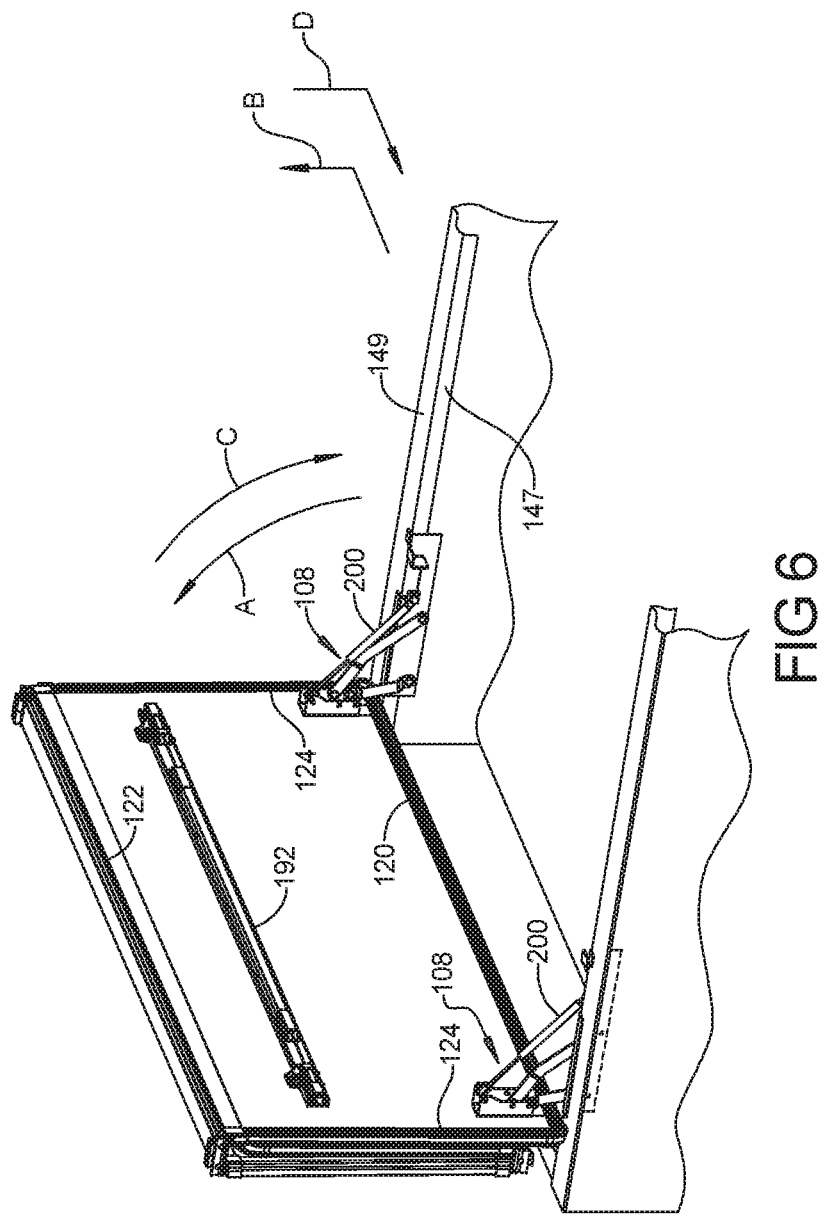
FIG. 6 is perspective view of the tonneau cover of the tonneau cover system in the storage configuration.
Figure 7:
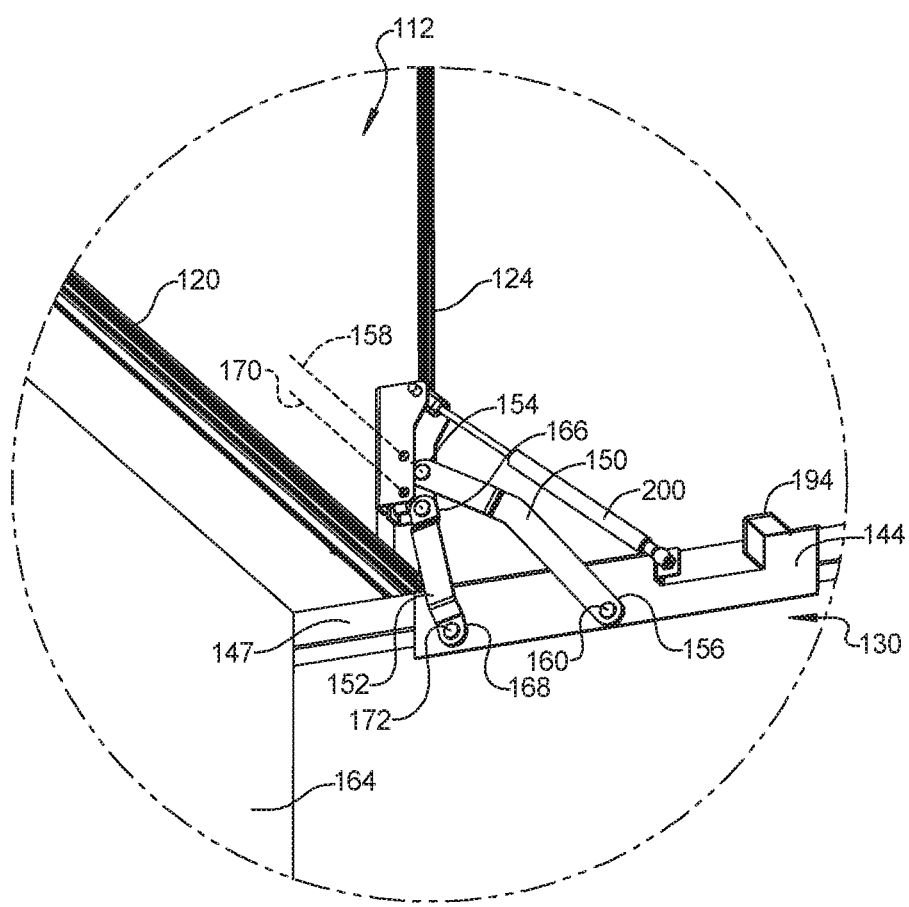
FIG. 7 is an expanded view of the pivot mechanism with the tonneau cover in the storage configuration.
Figure 8:
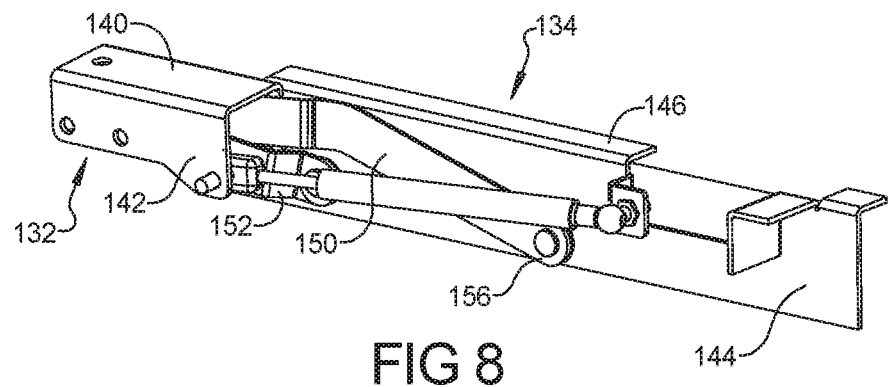
FIG. 8 is a perspective view of one exemplary embodiment of the pivot mechanism.
Figure 9:
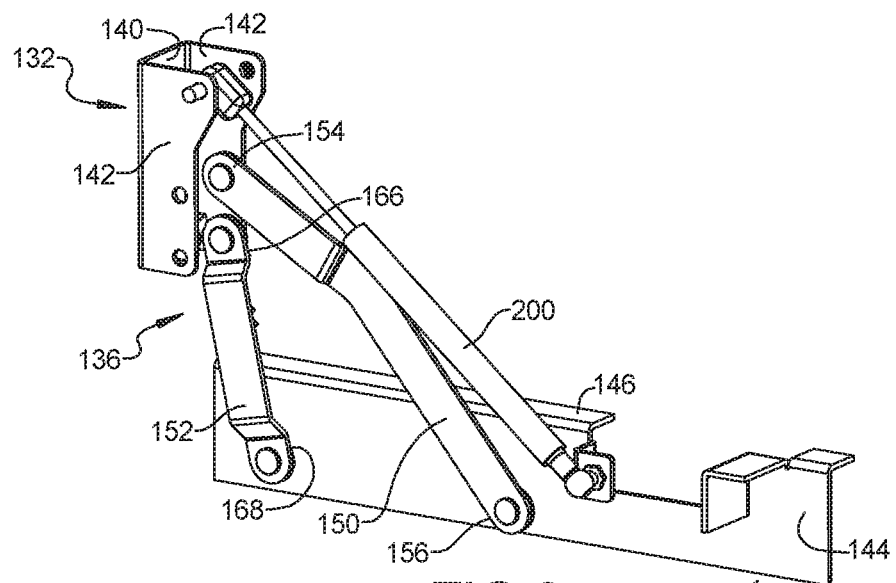
FIG. 9 is a perspective view of the pivot mechanism in state for placing the tonneau cover in the storage configuration.

In operation, the pivot member 108 of the system 100 can move the tonneau cover 106 from an initial stack configuration (e.g., FIGS. 2 and 5) to a storage stack configuration (e.g., FIGS. 3 and 6). More particularly, in the initial stack configuration, the forward panel 112 of the tonneau cover 106 can be in a first plane that can be parallel to the cargo box 102. From the initial stack configuration, in which the forward panel 112 can be the lowermost panel, the panels can be manually lifted in a direction represented by, for example, arrow A (e.g., FIG. 6). In response to the manual operation, the pivot member 108 can simultaneously move the stacked panels 110 toward the rear end of the cargo box 102 and upward away from the cargo box 102. The pivot member 108 can simultaneously move the forward edge 120 of the forward panel 112 rearwardly (i.e., toward the rear of the cargo box 102) and above the first plane, so that the tonneau cover 106 can be moved to the storage stack configuration. For example, the movement of the panels 110 by the pivot member 108 can be represented by arrow B. In the storage stack configuration, the forward panel 112 of the tonneau cover 106 can be in an upright position along a second plane. The second plane can be substantially perpendicular to the first plane.

While the figures illustrate the panels 110 as being substantially perpendicular to the first plane in the storage stack configuration, the panels 110 can be upright at other suitable angles. In some pickup trucks equipped with a center high mounted stop lamp (CHMSL), it may be desired to select an angle that prevents the stack from blocking the visibility of the CHMSL. In general, it is desired that the stack be tilted at least 80 degrees relative to the top of the sidewall 130, to optimize access to the cargo box 102. An angle greater than about 110 degrees may result in contact with the truck cab. Accordingly, the storage stack configuration of the panels 110 can be upright at an angle between 80 to 110 degrees with respect to the first plane.

The stacked panels can be maintained in the storage stack configuration in various suitable ways. For example, the cover linkage 132 can provide a hard stop to prevent the first link bar 150 and the second link bar 152 of the pivot linkage 136 from moving the panels 110 beyond the storage stack position.

From the storage stack configuration, the stacked panels 110 can be manually moved to the initial stack configuration by, for example, placing a downward force onto the panels 110, as represented by, for example, arrow C. In response to the downward force, the pivot member 108 can simultaneously move the panels toward the front end of the cargo box and downward toward the cargo box, as represented by, for example, arrow D, so that the forward panel 112 is in the first panel.

With some conventional tonneau cover systems, the tonneau cover can be stored away to provide access to the bed space but the tonneau cover can still cover, for example, a quarter or a third, of the cargo box. Unlike such tonneau cover systems, the tonneau cover system 100 of the present disclosure can fully open the bed space. Specifically, the pivot linkage 136 can simultaneously move and lift the panels 110 away from the cargo box 102 to a position above and perpendicular to the cargo box 102. Thus, the system 100 can fully open the bed space of the cargo box 102, so that the space can be fully utilized by a user.

Figure 4:
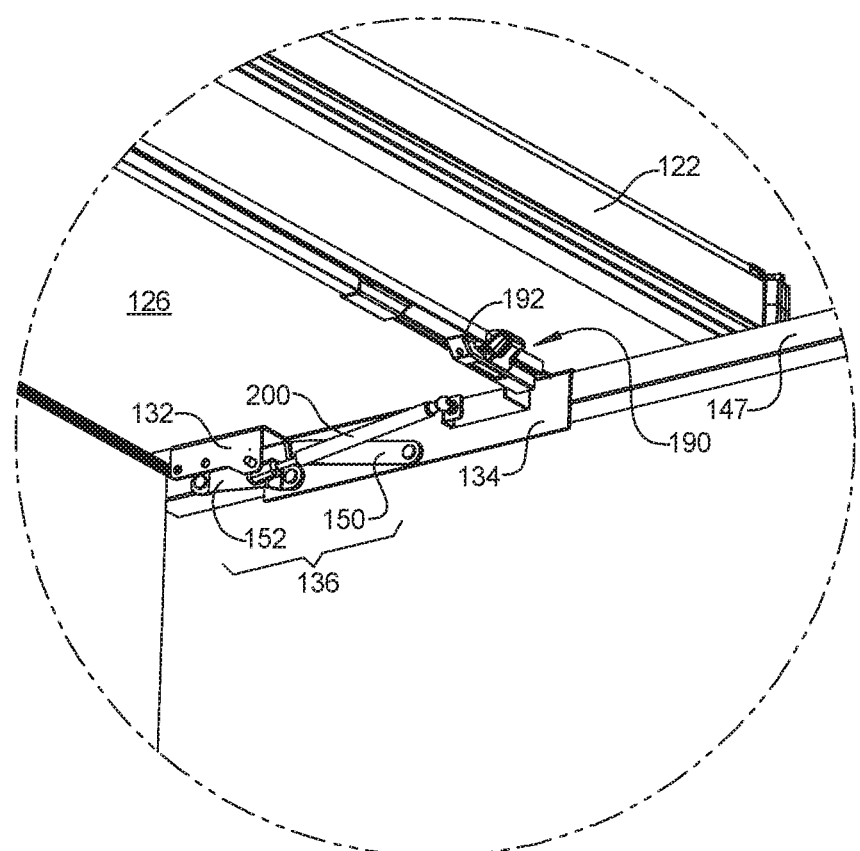
FIG. 4 is an expanded view of the pivot mechanism attached to the tonneau cover with the tonneau cover in the initial stacked configuration.
Figure 5:
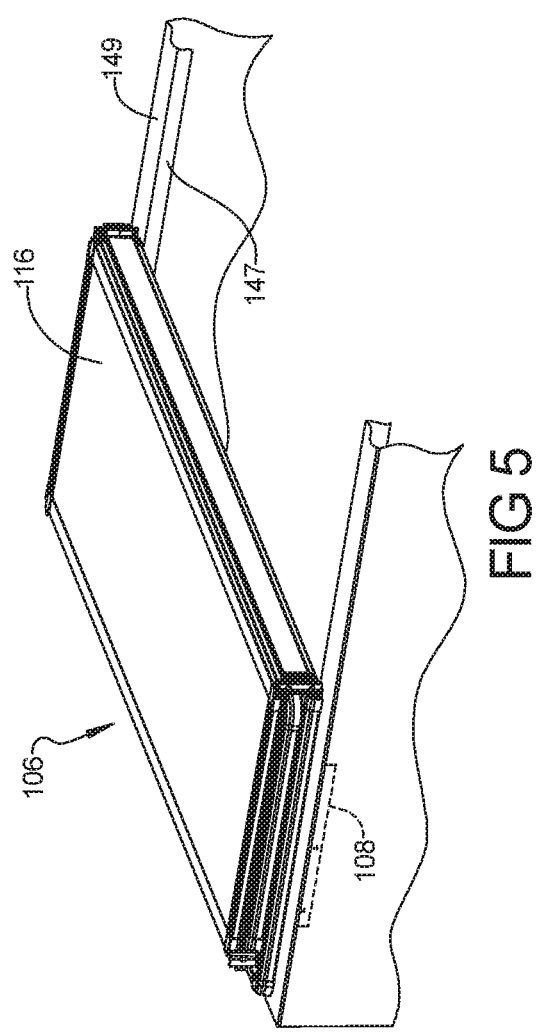
FIG. 5 is a perspective view of the tonneau cover of the tonneau cover system in the initial stacked configuration.

The tonneau cover system can also include a lock member or fastener 190 that can be operable to fasten the forward panel 112 of the tonneau cover 106 to the cargo box 102 (e.g., FIG. 4). For example, the lock member 190 can include a latch mechanism 192 that can be located on the underside surface 126 of the forward panel 112 adjacent to the side edge 124 of the panel 112 and include a bar member 194 that can be located on the pivot member 108. With the cover 106 in the initial stack configuration, the latch mechanism 192 can be slidable to engage or disengage with the bar member 194 of the pivot member 108. Thus, the forward panel 112 of the cover 106 can be fastened and unfastened to/from the cargo box 102.

The tonneau cover system 100 can also include a tilt assist member or trust 200 that can supply a force to assist in moving the panels 110 from the initial stack configuration to the storage stack configuration and to maintain the panels 110 in the storage stack configuration. The tilt assist member 200 can be a gas strut that can be connected to the forward panel 112 and the pivot member 108. To maintain the panels 110 in the storage stack configuration when, for example, the truck is in motion, the system 100 can also include a prop rod and/or a detent lock mechanism.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A tonneau cover system for a cargo box of a truck, the tonneau cover system comprising:
   a cover including a plurality of panels hingedly coupled together, the plurality of panels including a forward panel mountable adjacent a forward end of the cargo box, the forward panel comprising a forward edge, a rear edge, and a first side edge extending between the forward edge and the rear edge, wherein the cover is foldable between an extended configuration in which the cover extends along a first plane to overlie the cargo box and a folded configuration in which the plurality of panels are arranged in a stack on the forward panel; and
   a pivot mechanism for attaching the cover to the cargo box, wherein the pivot mechanism includes:
      a first link bar having an upper end pivotally connected to the forward panel adjacent the first side edge intermediate the forward edge and the rear edge at a first point located a first distance from the forward edge, and the first link bar having a lower end connectable to a sidewall of the cargo box and a first length, and
      a second link bar having an upper end pivotally connected to the forward panel adjacent the first side edge intermediate the forward edge and the rear edge at a second point located a second distance from the forward edge greater than the first distance, and the second link bar having a lower end connectable to the sidewall of the cargo box and a second length greater than the first length,
   wherein, with the cover in the folded configuration, the pivot mechanism is designed to move the stack from an initial stack configuration in which the forward panel is in the first plane to a storage stack configuration in which the forward panel of the cover extends upright along a second plane at an angle that is substantially perpendicular to the first plane, and to simultaneously move the forward edge of the forward panel rearwardly and above the first plane.

2. The tonneau cover system of claim 1 further comprising:
   a cover linkage connected to the forward panel of the cover, and the upper ends of the first and second link bars pivotably connect to the cover linkage.

3. The tonneau cover system of claim 1 further comprising:
   a sidewall linkage connectable to the sidewall of the cargo box and the lower ends of the first and second link bars pivotally connect to the sidewall of the cargo box.

4. The tonneau cover system of claim 1, wherein the cover includes a first panel, a second panel, and a third panel, and the cover is foldable such that the first panel folds onto the second panel and combination folds onto the third panel, and the forward panel corresponds to the third panel and is the lowermost panel in the stack.

5. The tonneau cover system according to claim 1, wherein the pivot mechanism further comprises a tilt assist that is connected to the forward panel and is connectable to the cargo box, wherein the tilt assist provides a biasing force against the stack when the stack moves between the initial stack configuration and the storage stack configuration.

6. The tonneau cover system according to claim 5, wherein the tilt assist is a gas strut.

7. The tonneau cover system according to claim 1, wherein with the stack in the storage stack configuration, the forward panel of the cover extends upright at an angle between 80 and 110 degrees to the first plane.

8. A tonneau cover system for a cargo box of a truck, the tonneau cover system comprising:
   a cover including a plurality of panels hingedly coupled together, the plurality of panels including a forward panel mountable adjacent a forward end of the cargo box, the forward panel comprising a forward edge, a rear edge, and a first side edge extending between the forward edge and the rear edge, wherein the cover is foldable between an extended configuration in which the cover extends along a first plane to overlie the cargo box and a folded configuration in which the plurality of panels are arranged in a stack on the forward panel; and a pivot mechanism for attaching the cover to the cargo box, wherein the pivot mechanism includes:

a cargo linkage connectable to a sidewall of the cargo box that is adjacent to the forward panel of the cover, a cover linkage connected to the forward panel of the cover, a pivot linkage that includes a first link bar and a second link bar, and a tilt assist has an upper end connected to the cover linkage and through which the upper end is connected to the cover and has a lower end connected to the cargo linkage and through which the lower end is connectable to the sidewall to provide a biasing force against the stack when the stack moves between the initial stack configuration and the storage stack configuration, wherein:

the first link bar has an upper end pivotally connected to the cover linkage and through which the upper end of the first link bar is connected to the forward panel adjacent the first side edge intermediate the forward edge and the rear edge at a first point located a first distance from the forward edge, and the first link bar has a lower end connected to the cargo linkage and through which the lower end of the first link bar is connectable to the sidewall, and the first link bar has a first length, the second link bar has an upper end pivotally connected to the cover linkage and through which the upper end of the second link bar is connected to the forward panel adjacent the first side edge intermediate the forward edge and the rear edge at a second point located a second distance from the forward edge greater than the first distance, and the second link bar has a lower end connected to the cargo linkage and through which the lower end of the second link bar is connectable to the sidewall, and the second link bar has a second length greater than the first length, and further wherein, with the cover in the folded configuration, the pivot mechanism is designed to move the stack from an initial stack configuration in which the forward panel is in the first plane to a storage stack configuration in which the forward panel of the cover extends upright along a second plane, and to simultaneously move the forward edge of the forward panel rearwardly and above the first plane.

9. The tonneau cover system according to claim 8, further comprises:

a lock mechanism disposed along the forward panel of the cover and operable to fasten the cover to the pivot mechanism, wherein the cargo linkage of the pivot mechanism includes a lock interface that engages with the lock mechanism to fasten the cover to the pivot mechanism.

10. The tonneau cover system according to claim 8, wherein the tilt assist is a gas strut.

11. The tonneau cover system according to claim 8, wherein the cargo linkage of the pivot mechanism is positioned along an interior of the cargo box.

12. The tonneau cover system according to claim 8, wherein the forward panel is lowermost panel in the stack when the stack is in the initial stack configuration.

13. The tonneau cover system of claim 8, wherein the cover includes a first panel, a second panel, and a third panel, and the cover is foldable such that the first panel folds onto the second panel and combination folds onto the third panel, and the forward panel corresponds to the third panel and is the lowermost panel in the stack.

14. The tonneau cover system according to claim 8, wherein with the stack in the storage stack configuration, the forward panel of the cover extends upright at an angle that is substantially perpendicular to the first plane.

15. The tonneau cover system according to claim 8, wherein with the stack in the storage stack configuration, the forward panel of the cover extends upright at an angle between 80 and 110 degrees to the first plane.

* * * * *